Feb. 7, 1961　　　H. M. GEYER　　　2,970,574
DUAL PISTON HYDRAULIC CENTERING ACTUATOR
Filed April 14, 1959　　　3 Sheets-Sheet 1
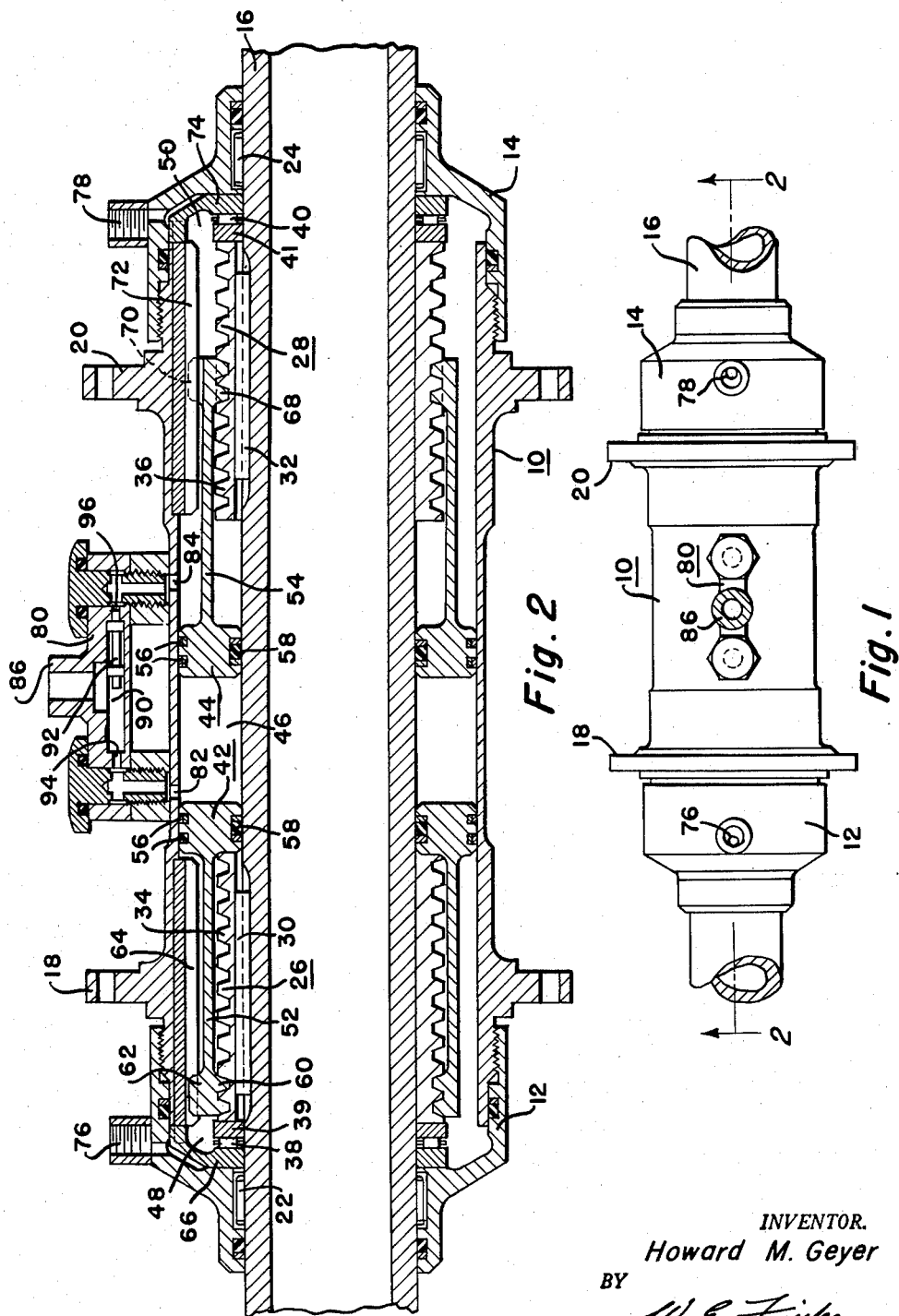
INVENTOR.
Howard M. Geyer
BY
His Attorney

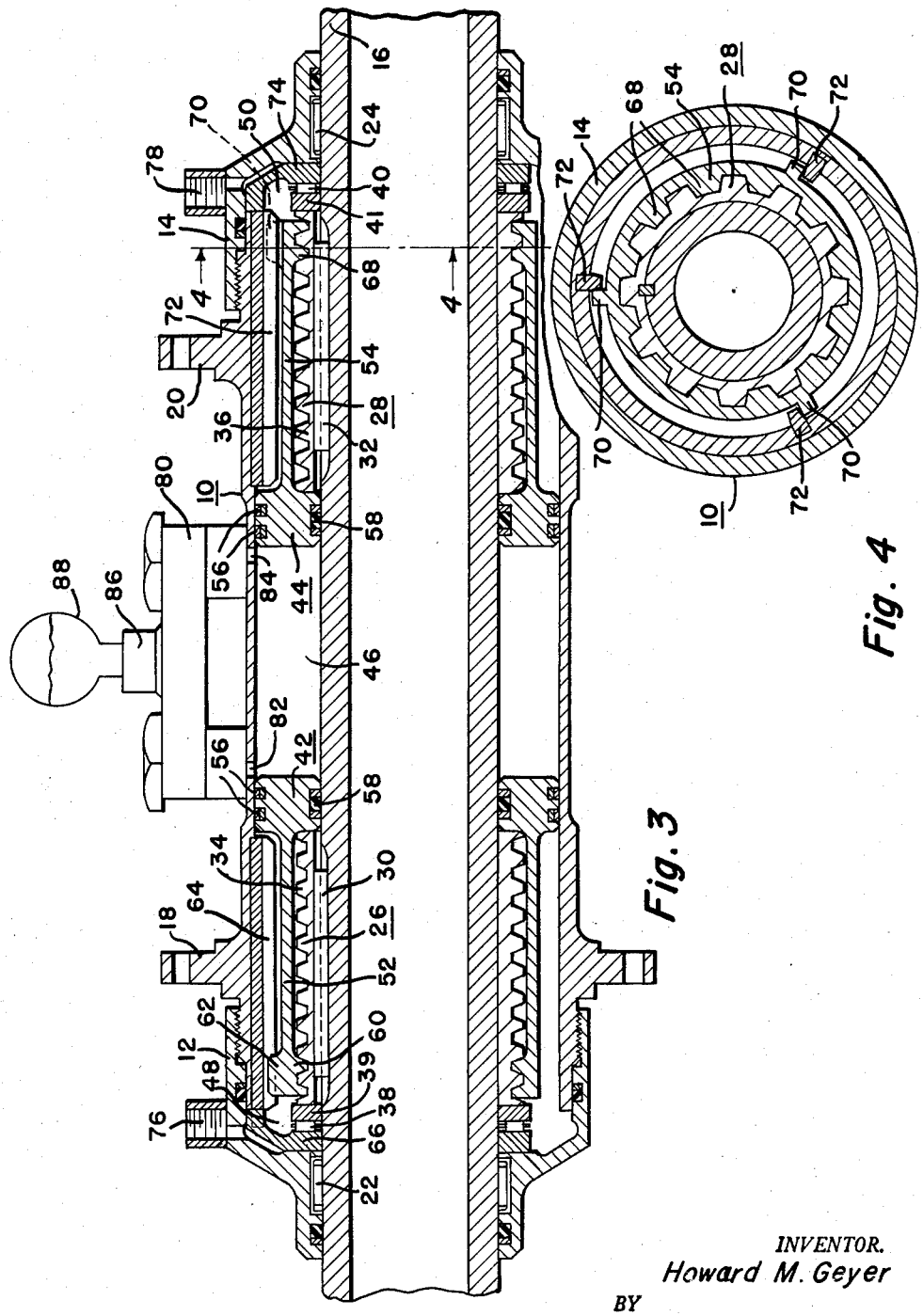
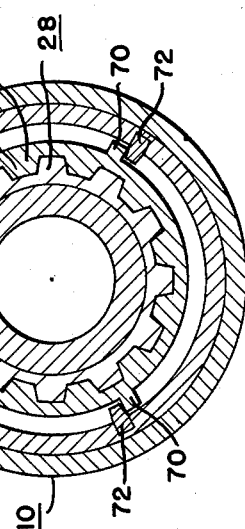
Fig. 3
Fig. 4
INVENTOR.
Howard M. Geyer
BY
His Attorney

# United States Patent Office 2,970,574
Patented Feb. 7, 1961

2,970,574

DUAL PISTON HYDRAULIC CENTERING ACTUATOR

Howard M. Geyer, Dayton, Ohio, assignor to General Motors Corporation, Detroit, Mich., a corporation of Delaware Filed Apr. 14, 1959, Ser. No. 806,315

10 Claims. (Cl. 121—40)

This invention pertains to centering devices, and particularly to hydraulically operated centering actuators.

In aircraft having a steerable nose wheel, it is necessary to provide means for automatically centering the nose wheel in instances where it is turned in one direction or the other by an external force. The present invention relates to devices for automatically restoring a rotatable shaft connected to a control device, such as the nose wheel of an aircraft, to a central position when the external force which caused turning of the shaft has been removed. In addition, the centering devices of this invention tend to resist turning movement of the shaft away from the centered position and thus operate as damping means. Accordingly, among my objects are the provision of a hydraulically operated centering device; the further provision of a hydraulically operated centering actuator having a pair of reciprocable pistons having opposite one-way driving connections with a shaft to be centered; the further provision of a hydraulic centering actuator of the aforesaid type wherein each piston has a helical spline connection with the shaft to be centered; and the still further provision of a hydraulic centering actuator of the aforesaid type having only a single set of helical splines with which the pistons are operatively engaged.

The aforementioned and other objects are accomplished in the present invention by normally maintaining the pistons in a spaced apart relation relative to each other under the urge of hydraulic fluid under pressure. Specifically, two embodiments of hydraulic centering actuators are disclosed herein. In one embodiment the actuator comprises a cylinder having a centrally located shaft extending therethrough and supported for rotation therein. The shaft has a pair of spaced apart sleeves keyed thereto having external helical spline teeth of the same hand and the same lead. The cylinder has a plurality of circumferentially spaced tangs attached thereto and radially spaced from the helically splined sleeves. The cylinder contains a pair of reciprocable pistons having axially extending skirts with internal helical spline teeth and a plurality of circumferentially spaced external straight splines. The straight splines on one of the piston skirts engage one side of the tangs in the cylinder, and the straight splines on the other piston skirt engage the other side of the tangs in the cylinder. In this manner during rotation of the shaft in one direction, one of the pistons will free wheel, i.e. rotate with the shaft relative to the cylinder, while the other piston will be reciprocated. Conversely, during rotation of the shaft in the other direction the first piston will be reciprocated and the second piston will free wheel.

The pistons divide the cylinder into three chambers, the center chamber of which constitutes the damping chamber. The two end chambers are connected to drain and the damping chamber is connected to a source of hydraulic fluid under pressure, such as an accumulator. In the first embodiment, the damping chamber has a pair of ports connected with the ends of a shuttle valve which is pressure responsive and prevents the accumulator from being connected to the drain chambers when the shaft is moved away from the centered position.

In the second embodiment the shaft has a single set of helical splines formed on an intermediate portion thereof, and the cylinder has a single set of circumferentially spaced tangs radially spaced from the helical splines. The helical splined piston skirts engage the helical splines on the shaft, and the straight spline teeth on the skirts engage opposite sides of the tangs. In the second embodiment the damping chamber between the two pistons is directly connected to the accumulator since the supply port is centrally located and thus can never be connected to one of the drain chambers.

During rotation of the shaft in one direction from a centered position, one of the pistons will be reciprocated in one direction while the other piston free wheels, and during rotation of the shaft in the opposite direction from the centered position the first piston will free wheel while the second piston reciprocates.

Both embodiments of the centering actuators operate to restore the shaft to a centered position when the external force which caused turning movement of the shaft has been removed. Thus, if the shaft is turned in one direction or the other, one of the pistons will be reciprocated inwardly thereby decreasing the volume of the damping chamber and forcing hydraulic fluid back into the accumulator. However, as soon as the external force is removed hydraulic fluid under pressure from the accumulator will flow back into the damping chamber and move the displaced piston back to its original position thereby rotating the shaft in the opposite direction back to its centered position.

Further objects and advantages of the present invention will be apparent from the following description, reference being had to the accompanying drawings, wherein preferred embodiments of the present invention are clearly shown.

In the drawings:

Figure 1 is a view in elevation of a centering actuator constructed according to one embodiment of the present invention.

Figure 2 is an enlarged sectional view taken along line 2—2 of Figure 1 showing the actuator in an off center position.

Figure 3 is a view similar to Figure 2 showing the actuator in the centered position.

Figure 4 is a sectional view taken along line 4—4 of Figure 3.

Figure 5:
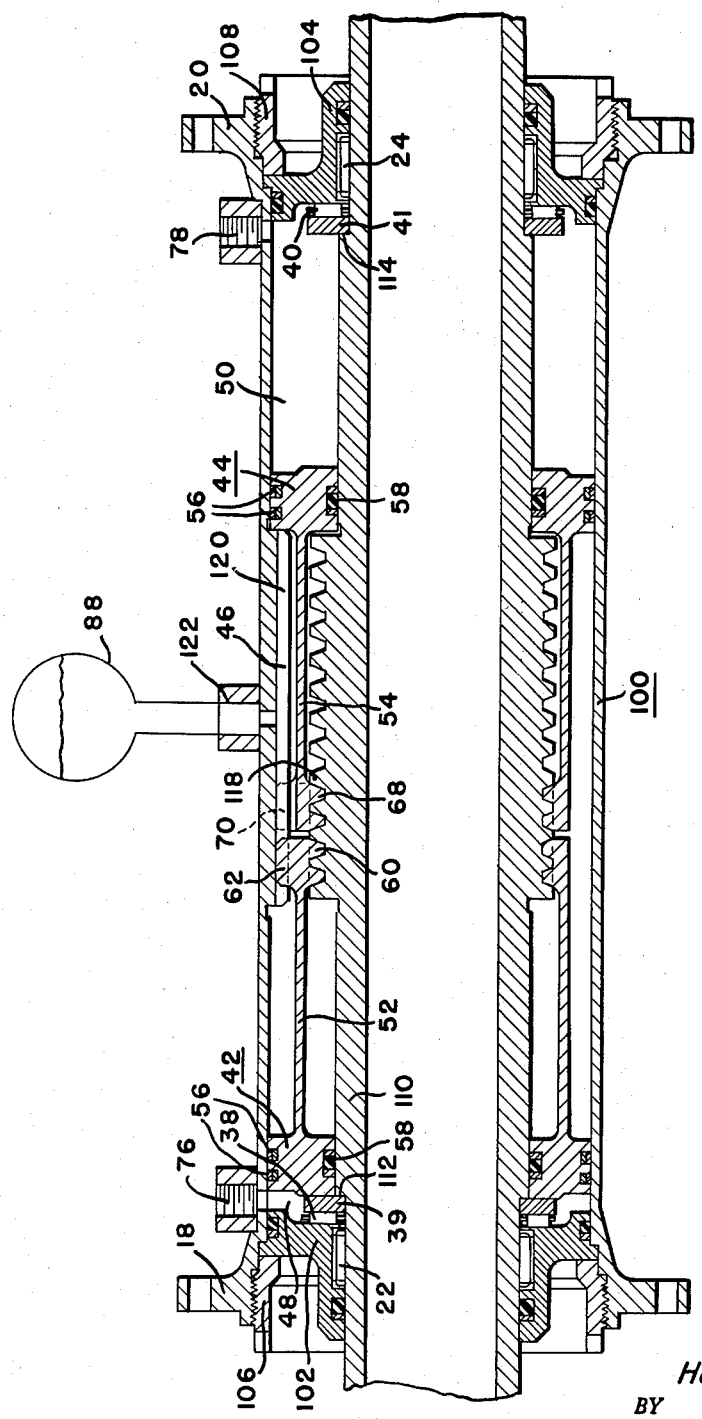
Figure 5 is a longitudinal, sectional view of a modified centering actuator constructed according to the present invention.

With particular reference to Figures 1 through 3, a hydraulic centering actuator is shown including a cylinder 10 having end caps 12 and 14 threadedly connected thereto. A centrally located hollow shaft 16 extends through the cylinder 10, the shaft 16 being connected to a suitable control device. The cylinder 10 has a pair of spaced mounting flanges 18 and 20 for attaching it to a fixed support, not shown. The shaft 16 is supported for rotation relative to the cylinder 10 by needle bearing assemblies 22 and 24 supported by the end caps 12 and 14. In addition, the shaft 16 has a pair of externally helically splined sleeves 26 and 28 connected thereto by keys 30 and 32. The helical spline teeth 34 on the sleeve 26 and the helical spline teeth 36 on the sleeve 28 are of the same hand and the same lead. For instance, in the disclosed embodiments, the helical spline teeth 34 and 36 are of the right hand type. The sleeves 26 and 28 are journalled for rotation relative to the cylinder 10 by needle type thrust bearings 38 and 40 and engage the inner races 39 and 41 thereof.

A pair of opposed reciprocable pistons 42 and 44 are disposed within the cylinder 10, and devide the cylinder 10 into a central damping chamber 46 and a pair of end chambers 48 and 50. The pistons 42 and 44 are formed with axially extending skirts 52 and 54, and the annular piston heads are provided with external and internal sealing rings 56 and 58, respectively, which engage the inner wall of the cylinder 10 and the periphery of the shaft 16, respectively.

The piston skirt 52 is formed with a set of internal helical spline teeth 60 which mate with external helical spline teeth 34 on the sleeve 26. The skirt 52 is also formed with three external straight splines 62 circumferentially spaced 120° apart. The left hand end of the cylinder 10 has three tangs 64 radially spaced from the sleeve 26, the tangs 64 being circumferentially spaced 120° apart. The outer race 66 of the needle bearing 38 is keyed to the tang 64 so as to be restrained against rotation relative to the cylinder. The number and angular spacing of the straight splines may vary in different installations. The piston 42 can free wheel, or rotate without axial movement, in a direction away from the front side of the tang 64 as shown in Figure 2 throughout an angle of substantially 120°. However, rotation of the piston 42 towards the front face of the tang 64 as viewed in Figure 2 is precluded, and hence, rotation of the shaft 16 in this direction will cause axial movement of the piston 42 to the right, as viewed in Figure 2.

The skirt 54 of the piston 44 likewise has a set of internal helical spline teeth 68 which mate with the helical spline teeth 36 of the sleeve 28. The skirt 54 likewise has three external straight splines 70 circumferentially spaced 120° apart which are angularly offset with respect to the straight splines 62. The straight spline teeth 70 are engageable with the rear side of the three tangs 72 attached to the cylinder 10 and circumferentially spaced 120° apart, so that the piston 44 can free wheel in a direction away from the rear side of the tang 72 as viewed in Figure 2 without axial movement. However, rotation of the piston 44 towards the rear side of the tang 72 is precluded, and hence, rotation of the shaft 16 in this direction will cause axial movement of the piston 44 to the left, as viewed in Figure 4. The outer race 74 of the needle bearing 40 is keyed to the tangs 72 so as to be restrained against rotation relative to the cylinder 10.

The end chambers 48 and 50 are connected to drain through ports 76 and 78. The central part of the cylinder 10 has a porting block 80 attached thereto having ports 82 and 84 which communicate with the damping chamber 46 when the shaft 16 is centered and the pistons are in the positions indicated in Figure 3. The porting block 80 includes a supply port 86, which, as shown in Figure 3, may be connected to an accumulator 88 which is charged with hydraulic fluid under pressure. The supply port 86 connects with a shuttle valve chamber 90 containing a reciprocable pressure responsive shuttle valve 92 operable to close either of the passages 94 or 96 connecting with the ports 82 and 84, respectively, when either of the pistons 42 or 44 is moved to a position such that either the port 82 or the port 84 communicates with a drain chamber 48 or 50, respectively, thereby preventing the accumulator from being connected to drain.

Normally, the pistons 42 and 44 are maintained in their extended positions by hydraulic pressure from the accumulator 88 as depicted in Figure 3. This represents the centered position of the shaft 16. Rotation of the shaft 16 in either direction from the centered position will be opposed by either the piston 42 or the piston 44 since one, or the other of the pistons will move towards the center of the cylinder thereby reducing the volume of the damping chamber 46 and forcing fluid back to the accumulator 88. Since the damping chamber 46 is under pressure at all times, the pistons 42 and 44 will oppose rotation of the shaft 16 in either direction and will thus tend to maintain the shaft in a centered position.

However, if the shaft 16 should be rotated in either direction from the centered position one or the other of the pistons 42 or 44 will move inwardly. With reference to Figure 4, if the piston 16 is rotated in the clockwise direction, the sleeve 28 will likewise be rotated in the clockwise direction. Since the helical spline teeth 36 are of the right hand type and since the straight splines 70 engage the back side of the tangs 72, the piston 44 cannot rotate in the clockwise direction whereupon the piston 44 will move axially to the left from the position of Figure 3 towards the position of Figure 2. At this time, the piston 42 will rotate, or free wheel, in the clockwise direction since the straight spline teeth 62 and the tangs 64 can only cooperate to restrain counterclockwise rotation of the piston 42. During axial inward movement of the piston 44, hydraulic fluid will be forced from the damping chamber 46 through the port 82 and the passage 94 thereby moving the shuttle valve 92 to the position shown in Figure 2 wherein passage 96 is closed. The hydraulic fluid will be forced back into the accumulator 88 through the shuttle valve passage 90 and the port 86. As soon as the external force which rotated shaft 16 in the clockwise direction away from the center position is removed, hydraulic fluid from the accumulator 88 can flow back into the damping chambers 46 and move the piston 44 towards the right, or outwardly, as viewed in Figure 2. Since the helical spline teeth 68 mate with the helical spline teeth 36 of the sleeve 28, and since the piston 44 is restrained against rotation in the clockwise direction by engagement between the straight spline teeth 70 and the tangs 72, outward movement of the piston 44 will impart counterclockwise rotation of the sleeve 28 and the shaft 16. During counterclockwise rotation of the shaft 16 back to its centered position, the piston 42 will be rotated in the counterclockwise direction without being moved axially since the straight spline teeth 62 will not reengage the tangs 48 until the shaft 16 is returned to the centered position.

Conversely, if the shaft 16 is rotated in the counterclockwise direction away from the centered position, as viewed in Figure 4, the piston 44 will free wheel in the counterclockwise direction while the piston 42 will move axially inward due to engagement between the straight spline teeth 62 and the tangs 64. At this time hydraulic fluid will be forced through port 84 and passage 96 thereby moving the shuttle valve 92 to the left as viewed in Figure 2 so as to close passage 94. When the external force acting on the shaft 16 is removed, hydraulic fluid from the accumulator 88 will recenter the shaft 16 by effecting axial outward movement of the piston 42 resulting in clockwise rotation of the shaft 16 to return it to its centered position. Naturally, during inward and outward movement of the piston 42, the piston 44 is free to rotate relative to the cylinder until the shaft is returned to its centered position.

With reference to Figure 5, a modified centering actuator is disclosed, similar numerals depicting similar parts as in the first embodiment. Thus, the modified centering actuator includes a cylinder 100 having integral mounting flanges 18 and 20 and a pair of end caps 102 and 104 held in assembled relation with the cylinder by nuts 106 and 108. A hollow shaft 110 is centrally located in the cylinder 100 and journalled for rotation relative thereto by needle bearings 22 and 24. The shaft 110 is formed with a pair of shoulders 112 and 114 which engage the outer races 39 and 41, of needle thrust bearings 38 and 40, respectively. The shaft 110 is formed with a single set of external helical spline teeth 118 located in the central part of the actuator cylinder.

The cylinder 100 carries a single set of tangs 120 circumferentially spaced 120° apart. As depicted in Figure 5, the tangs 120 are integral with the cylinder 100. The pistons 42 and 44 divide the cylinders 100 into a damping chamber 46 and end chambers 48 and 50. The end chambers 48 and 50 are connected to drain ports 76 and 78, respectively. The damping chamber 46 is connected to a single pressure port 122 that is connected with the accumulator 88. The pistons 42 and 44 are identical with the piston shown in the first embodiment and thus include axially extending skirts 52 and 54 having internal helical spline teeth 60 and 68, respectively, and three external straight splines 62 and 70, respectively, circumferentially spaced 120° apart. However, since only a single set of helical spline teeth 118 are formed on the shaft 110, the pistons 42 and 44 are turned end for end in the embodiment shown in Figure 5 with respect to their positions in the embodiment shown in Figure 2. The straight spline teeth 62 engage the front side of the tangs 120 as shown in Figure 5, and the straight spline teeth 70 engage the rear side thereof when the shaft 110 is in the centered position. Since the pistons 42 and 44 cannot connect the port 122 to a drain chamber, the necessity for a shuttle valve is eliminated in the embodiment shown in Figure 5.

The centering actuator shown in Figure 5 operates in a manner identical to that described in the embodiment shown in Figures 1 through 4 in that during rotation of the shaft 110 from the centered position in one direction, one of the pistons free wheels and the other piston is moved axially inwardly due to engagement between the straight splines and the tangs 120. Moreover, as soon as the external load which moved the shaft 110 from the center position is removed, hydraulic fluid from the accumulator 88 will move the displaced piston axially outward into engagement with the outer race 39 or 41 of its respective thrust bearing, 38 or 40, thereby centering the shaft 110.

While the embodiments of the invention as herein disclosed constitute preferred forms, it is to be understood that other forms might be adopted.

What is claimed is as follows:

1. A hydraulically operated centering actuator comprising, a cylinder, a shaft rotatably journalled in said cylinder and extending outside thereof, a pair of opposed reciprocable pistons disposed within said cylinder and dividing said cylinder into a central damping chamber and a pair of opposed end chambers connected to drain, said damping chamber being subjected to hydraulic fluid under pressure urging said pistons apart so as to maintain the shaft in a centered position, a helical connection between each piston and said shaft, means interconnecting one of said pistons and said cylinder so as to preclude relative rotation thereof in one direction and permit rotation thereof in the opposite direction when the shaft is in the centered position, and means operatively interconnecting the other piston and said cylinder to preclude rotation of the other piston in the opposite direction and permit rotation thereof in said one direction when the shaft is in the centered position whereby rotation of said shaft in either direction away from the centered position will impart reciprocation to one or the other of said pistons which movement is opposed by the hydraulic fluid in the damping chamber.

2. A hydraulically operated centering actuator including, a cylinder, a shaft rotatably journalled in said cylinder and extending outside thereof, a pair of opposed reciprocable pistons disposed within said cylinder and dividing said cylinder into a damping chamber and a pair of opposed end chambers connected to drain, said damping chamber being subjected to hydraulic fluid under pressure urging said pistons apart so as to maintain the shaft in a centered position, and opposed one-way helical driving connections between said pistons and said shaft whereby rotation of said shaft in either direction away from the centered position will impart reciprocation to one of said pistons towards the other piston.

3. A hydraulically operated centering actuator including, a cylinder, a shaft rotatably journalled in said cylinder and extending outside thereof, a pair of opposed reciprocable pistons disposed within said cylinder and dividing said cylinder into a damping chamber and a pair of opposed end chambers connected to drain, said damping chamber being subjected to hydraulic fluid under pressure urging said pistons apart so as to maintain the shaft in a centered position, said pistons having axially extending skirts, and opposed one-way helical driving connections between said piston skirts and said shaft whereby rotation of said shaft in either direction away from the centered position will impart reciprocation to one of said pistons toward the other piston.

4. A hydraulically operated centering actuator including, a cylinder, a shaft rotatably journalled in said cylinder and extending outside thereof, a pair of opposed reciprocable pistons disposed within said cylinder and dividing said cylinder into a damping chamber and a pair of opposed end chambers connected to drain, said damping chamber being subjected to hydraulic fluid under pressure urging said pistons apart so as to maintain said shaft in a centered position, said pistons having axially extending skirts with internal helical spline teeth and at least one external straight spline, straight spline means on said cylinder, said straight splines on said piston skirts being angularly offset whereby the straight splines on said skirts are engageable with opposite sides of the straight spline means of said cylinder, and helical spline means on said shaft engageable with helical spline teeth on said piston skirts whereby rotation of said shaft in either direction away from the centered position will impart reciprocation to one of said pistons while the other piston rotates.

5. A hydraulically operated centering actuator including, a cylinder, a shaft rotatably journalled in said cylinder and extending outside thereof, a pair of opposed reciprocable pistons disposed within said cylinder and diving said cylinder into a central damping chamber and a pair of opposed end chambers connected to drain, said damping chamber being subjected to hydraulic fluid under pressure urging said pistons apart so as to maintain said shaft in a centered position, each piston having an axially extending skirt with internal helical spline teeth and a plurality of circumferentially spaced external straight spline teeth, the straight spline teeth on one piston skirt being angularly offset with respect to the straight spline teeth on the other piston skirt, straight spline means attached to said cylinder, the straight spline teeth on said piston skirts being engageable with opposite sides of the straight spline means on the cylinder whereby said pistons are free to rotate in opposite directions relative to said cylinder, and helical spline means connected with said shaft engaging the helical spline teeth of said piston skirts whereby rotation of said shaft in either direction away from the centered position will impart reciprocation to one of said pistons and rotation to the other of said pistons.

6. The hydraulically operated centering actuator set forth in claim 5 wherein said piston skirts extend away from each other, and wherein the helical spline means connected to said shaft comprise a pair of sleeves keyed to said shaft having external spline teeth.

7. The hydraulically operated centering actuator set forth in claim 6 including a pressure responsive shuttle valve, a pair of passages connecting opposite ends of said shuttle valve to the central part of said cylinder, and a central pressure supply port for said shuttle valve, said shuttle valve responding to supply pressure to close either of said passages when the central part of said cylinder is connected to drain whereby the pressure supply port will not be connected to either of said end chambers.

8. The centering actuator set forth in claim 5 wherein said piston skirts extend towards each other, and wherein the helical spline means connected to said shaft comprise a set of helical splines integral with said shaft and disposed centrally of the actuator cylinder.

9. An actuator assembly including, a cylinder, a pair of opposed reciprocable pistons disposed in said cylinder, a shaft rotatably journalled in said cylinder, and opposed one-way helical driving connections between said pistons and said shaft whereby rotation of said shaft in either direction away from a centered position will impart reciprocation to one of said pistons.

10. An actuator assembly including, a cylinder, a pair of opposed reciprocable pistons disposed in said cylinder and urged towards opposite ends thereof, a shaft rotatably journalled in said cylinder, and opposed one-way connections between said pistons and said shaft whereby rotation of said shaft in either direction away from a centered position will cause movement of one of said pistons towards the other piston.

References Cited in the file of this patent
UNITED STATES PATENTS

| | | |
|---|---|---|
| 404,472 | Dunn | June 4, 1889 |
| 2,886,005 | Bryan | May 12, 1959 |
| 2,897,786 | Geyer | Aug. 4, 1959 |